(12) United States Patent
Yao et al.

(10) Patent No.: US 11,689,073 B2
(45) Date of Patent: Jun. 27, 2023

(54) ROTOR CORE DESIGN

(71) Applicant: GM Global Technology Operations LLC, Detroit, MI (US)

(72) Inventors: Jian Yao, Shanghai (CN); Chengwu Duan, Shanghai (CN); Yusheng Zou, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 76 days.

(21) Appl. No.: 17/401,613

(22) Filed: Aug. 13, 2021

(65) Prior Publication Data
US 2023/0048820 A1 Feb. 16, 2023

(51) Int. Cl.
*H02K 1/14* (2006.01)
*H02K 1/276* (2022.01)
*H02K 15/03* (2006.01)

(52) U.S. Cl.
CPC ........... *H02K 1/2766* (2013.01); *H02K 15/03* (2013.01); *H02K 1/148* (2013.01)

(58) Field of Classification Search
CPC ..... H02K 1/2795; H02K 1/2793; H02K 21/24
USPC ..................................................... 310/156.53
See application file for complete search history.

(56) References Cited

U.S. PATENT DOCUMENTS

| | | | |
|---|---|---|---|
| 5,801,473 A | 9/1998 | Helwig | |
| 10,566,866 B2* | 2/2020 | Woolmer | H02K 1/2793 |
| 10,903,729 B1* | 1/2021 | Cunnyngham | H02K 1/265 |
| 10,944,303 B2* | 3/2021 | Hong | H02K 29/03 |
| 2002/0163272 A1 | 11/2002 | Larsson et al. | |
| 2004/0028945 A1 | 2/2004 | Jurisch | |
| 2004/0063536 A1 | 4/2004 | Atarashi | |
| 2004/0212267 A1* | 10/2004 | Jack | H02K 21/24 310/156.56 |
| 2004/0245879 A1* | 12/2004 | Hirzel | H02K 21/24 310/156.01 |
| 2007/0205675 A1 | 9/2007 | Petro et al. | |

(Continued)

FOREIGN PATENT DOCUMENTS

| | | |
|---|---|---|
| DE | 102015223766 A1 | 6/2017 |
| DE | 112017005600 | 9/2019 |

(Continued)

OTHER PUBLICATIONS

Kim et al, "Comparison of Axial Flux Permanent Magnet Synchronous Machines With Electrical Steel Core and Soft Magnetic Composite Core"; 2017, IEEE (Year: 2017).*

(Continued)

*Primary Examiner* — Quyen P Leung
*Assistant Examiner* — Masoud Vaziri
(74) *Attorney, Agent, or Firm* — Vivacqua Crane PLLC

(57) ABSTRACT

An axial flux electric motor for an automobile includes a stator assembly, and a rotor assembly, the rotor assembly including a plurality of lamination blocks arranged in an annular pattern, a plurality of conductive wedges, one conductive wedge being positioned between each adjacent pair of lamination blocks, the plurality of lamination blocks and the plurality of conductive wedges defining a rotor core disk having an inner diameter and outer diameter and opposing axial faces, and a plurality of permanent magnets attached to one of the opposing axial faces of the rotor core disk.

20 Claims, 3 Drawing Sheets

(56) References Cited

U.S. PATENT DOCUMENTS

| | | | |
|---|---|---|---|
| 2008/0303369 A1* | 12/2008 | Ionel | H02K 1/143 |
| | | | 310/426 |
| 2010/0225195 A1 | 9/2010 | Asano et al. | |
| 2011/0095642 A1 | 4/2011 | Enomoto et al. | |
| 2011/0221297 A1 | 9/2011 | Langford et al. | |
| 2011/0241460 A1 | 10/2011 | Mebarki et al. | |
| 2011/0309726 A1 | 12/2011 | Carpenter et al. | |
| 2012/0126653 A1 | 5/2012 | Yang et al. | |
| 2013/0127275 A1 | 5/2013 | Camilleri et al. | |
| 2013/0147291 A1 | 6/2013 | Woolmer et al. | |
| 2013/0181565 A1 | 7/2013 | Petro et al. | |
| 2015/0214789 A1 | 7/2015 | Lenz et al. | |
| 2015/0311756 A1* | 10/2015 | Sullivan | H02K 1/2791 |
| | | | 310/156.37 |
| 2016/0020656 A1* | 1/2016 | Brahmavar | H02K 15/03 |
| | | | 29/598 |
| 2016/0226352 A1 | 8/2016 | King et al. | |
| 2016/0226353 A1 | 8/2016 | Court et al. | |
| 2017/0025927 A1 | 1/2017 | Weerts et al. | |
| 2017/0054336 A1 | 2/2017 | Takezaki et al. | |
| 2017/0155290 A1 | 6/2017 | Sakai et al. | |
| 2017/0155291 A1 | 6/2017 | Deàk et al. | |
| 2017/0179775 A1 | 6/2017 | Kim et al. | |
| 2017/0187252 A1 | 6/2017 | Takahashi et al. | |
| 2018/0301947 A1 | 10/2018 | Tsai et al. | |
| 2019/0013707 A1 | 1/2019 | Mihaila et al. | |
| 2019/0221361 A1* | 7/2019 | Manz | H01F 27/325 |
| 2019/0305617 A1* | 10/2019 | Brahmavar | H02K 1/2793 |
| 2019/0305655 A1 | 10/2019 | Brahmavar | |
| 2020/0251946 A1* | 8/2020 | Yao | H02K 1/28 |
| 2020/0355447 A1* | 11/2020 | Rippel | F28D 1/0473 |
| 2022/0115924 A1 | 4/2022 | Zhang et al. | |
| 2022/0337112 A1* | 10/2022 | Vianello | H02K 1/2795 |

FOREIGN PATENT DOCUMENTS

| | | |
|---|---|---|
| DE | 102020127447 A1 | 5/2021 |
| WO | 2013099343 A1 | 7/2013 |
| WO | 2020042912 A1 | 3/2020 |
| WO | 2021005084 A1 | 1/2021 |

OTHER PUBLICATIONS

Kim et al, "Comparison of Axial Flux Permanent Magnet Synchronous Machines With Electrical Steel Core and Soft Magnetic Composite Core"; 2017,IEEE (Year :2017) (Year: 2017).*
U.S. Appl. No. 17/387,473, filed Jul. 28, 2021, Jian Yao.
U.S. Appl. No. 17/401,663, filed Aug. 13, 2021, Jian Yao.
Ramanujam, M, "Performance improvement in PM machine using two-piece stator design", IEEE (Year: 2018).
Aydin et al., "Minimization of Cogging Torque in Axial-Flux Permanent-Magnet Machines: Design Concepts", IEEE Transactions on Magnetics, vol. 43, No. 9, 2007 (Year: 2007).

* cited by examiner

ROTOR CORE DESIGN

INTRODUCTION

The present disclosure relates to an axial flux electric motor for use in an automobile, and more particularly to a rotor core for an axial flux electric motor that includes both soft magnetic composite (SMC) material and lamination stacks.

An electric motor is a machine that transforms electrical energy into mechanical energy by means of the action of the magnetic fields generated in its coils. An electric motor creates rotational, or circular, motion. The central part of the motor is a cylinder called the armature or rotor. The rotor is the part of the motor that spins. An axial flux motor (also known as an axial gap motor, or pancake motor) is a geometry of motor construction where the gap between the rotor and stator, and therefore the direction of magnetic flux between the two, is aligned parallel with the axis of rotation, rather than radially as with the concentric cylindrical geometry of the more common radial gap motor. In an axial flux electric motor, the stator is positioned next to the rotor and holds insulated coils of wire, usually copper. When a current is applied to the motor, the stator generates a magnetic field that drives the rotor.

Rotor cores that are made entirely from lamination stacks comprising layers of lamination steel provide good flux permeability and result in low core losses. Forming rotor cores from a lamination stack is complex and results in manufacturing and cost issues. Soft magnetic composite materials can be used in place of a lamination stack. SMC materials are more easily manufactured; however, SMC provides lower flux permeability and higher core losses compared to lamination stacks. Rotor cores include permanent magnets spaced circumferentially on the core. Flux currents flow between the permanent magnets through the core disk, resulting in areas where flux currents are highly concentrated and areas where flux currents are less concentrated.

Thus, while current axial flux electric motor rotors achieve their intended purpose, there is a need for a new and improved rotor and axial flux electric motor having a core that comprises both SMC materials and lamination stacks, whereby the lamination stacks are positioned where magnetic flux density is highest and SMC material is used where flux current density is lower.

SUMMARY

According to several aspects of the present disclosure, an axial flux electric motor for an automobile includes a stator assembly, and a rotor assembly, the rotor assembly including a plurality of lamination blocks arranged in an annular pattern, a plurality of conductive wedges, one conductive wedge being positioned between each adjacent pair of lamination blocks, the plurality of lamination blocks and the plurality of conductive wedges defining a rotor core disk having an inner diameter and outer diameter and opposing axial faces, and a plurality of permanent magnets attached to one of the opposing axial faces of the rotor core disk.

According to several aspects of the present disclosure, a rotor core for an axial flux electric motor for an automobile includes a plurality of lamination blocks arranged in an annular pattern, a plurality of conductive wedges, one conductive wedge being positioned between each adjacent pair of lamination blocks, the plurality of lamination blocks and the plurality of conductive wedges defining a rotor core disk having an inner diameter and outer diameter and opposing axial faces, and a plurality of permanent magnets attached to one of the opposing axial faces of the rotor core disk.

According to another aspect, the lamination blocks are formed of layers of lamination steel.

According to another aspect, the lamination blocks are generally rectangular in shape.

According to another aspect, the lamination blocks are stepped.

According to another aspect, the lamination steel is a grain oriented lamination steel.

According to another aspect, the lamination steel is a non-grain oriented lamination steel.

According to another aspect, the conductive wedges are formed from a soft magnetic composite material.

According to another aspect, the rotor core further includes a back plate made from soft magnetic composite material and integrally formed with the plurality of conductive wedges, the back plate and the plurality of conductive wedges defining a frame, the plurality of lamination blocks supported by the frame.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
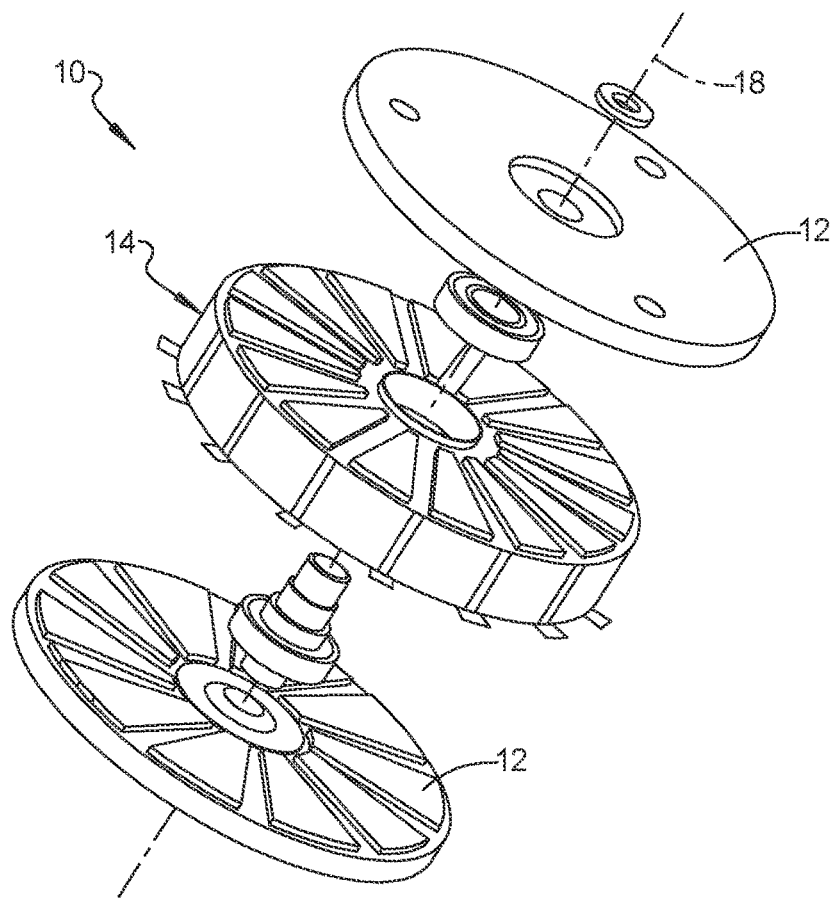
FIG. 1 is an exploded view of an axial flux electric motor according to an exemplary embodiment of the present disclosure.

Referring to FIG. 1, an axial flux electric motor 10 for an automobile includes a rotor assembly 12 and a stator core assembly 14. The rotor assembly 12 may include a single rotor 12 positioned adjacent the stator core assembly 14, or, alternatively, the rotor assembly 12 may include two rotors 12, one positioned on either side of the stator core assembly 14, as shown in FIG. 1.

Figure 2:
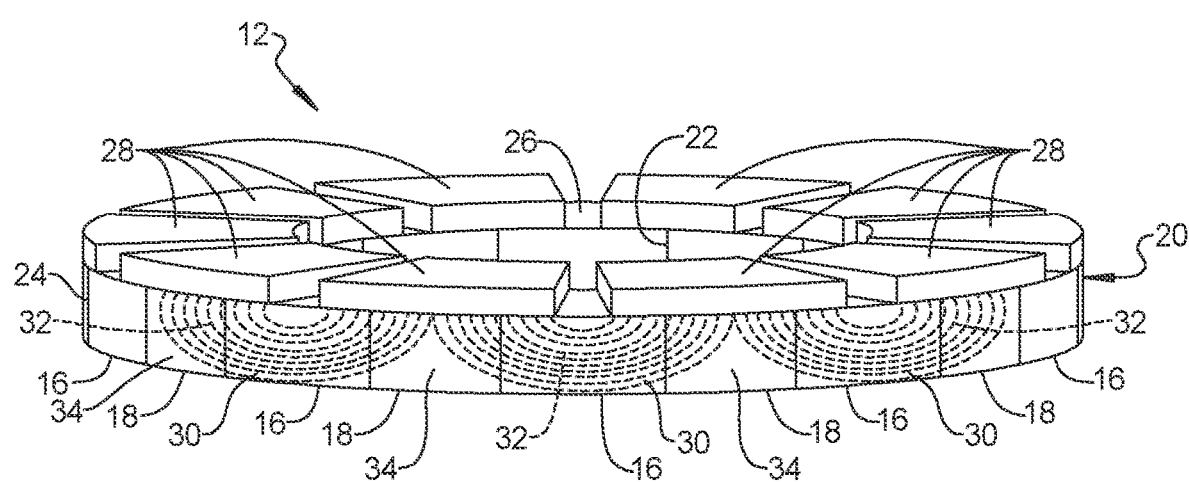
FIG. 2 is a perspective view of a rotor core disk according to an exemplary embodiment of the present disclosure.

Referring to FIG. 2, the rotor core 12 includes a plurality of lamination blocks 16 arranged in an annular pattern, and a plurality of conductive wedges 18. One conductive wedge 18 is positioned between each adjacent pair of lamination blocks 16. The plurality of lamination blocks 16 and the plurality of conductive wedges 18 defining a rotor core disk 20 having an inner diameter 22 and outer diameter 24 and opposing axial faces 26. A plurality of permanent magnets 28 are attached to one of the opposing axial faces 26 of the rotor core disk 20. The permanent magnets 28 are positioned on the axial face 26 of the rotor core 12 that faces the stator 14.

The lamination blocks 16 are formed of layers of lamination steel. The lamination steel is either grain-oriented or non-grain oriented lamination steel. Material properties of grain-oriented lamination steel provides for efficient conduction of magnetic fields 30 through the lamination steel in a particular direction. The lamination blocks 16 are formed with layers of the lamination steel oriented in a particular way and the lamination blocks 16 are oriented within the rotor core 12 in a particular way to promote efficient conduction of magnetic fields 30 during operation of the electric motor 10. To accommodate specific design considerations of the electric motor 10, the lamination blocks 16 can include layers of lamination steel of an appropriate thickness, or a combination of layers of lamination steel having varying thickness. In addition, the lamination blocks 16 can be formed with different combinations of grain-oriented and non-grain oriented lamination steel.

The conductive wedges 18 are formed from a soft magnetic composite material. Referring again to FIG. 2, magnetic fields 30 flow between adjacent permanent magnets 28 that are spaced around the axial face 26 of the rotor core 12. The lamination blocks 16 are positioned between adjacent pairs of permanent magnets 28 to accommodate the higher density magnetic fields 30 that flow through that position, as indicated at 32. Soft magnetic composite materials are used to form the conductive wedges 18, which are positioned immediately adjacent the permanent magnets 28 where the density of the magnetic fields 30 is lower, as indicated at 34. The higher magnetic permeability of the lamination blocks 16 is needed at the positions 32 where high density magnetic fields 30 flow. The lower magnetic permeability of the soft magnetic composite material of the conductive wedges 18 is suitable for use at the positions 34 where lower density magnetic fields 30 flow.

Figure 3:
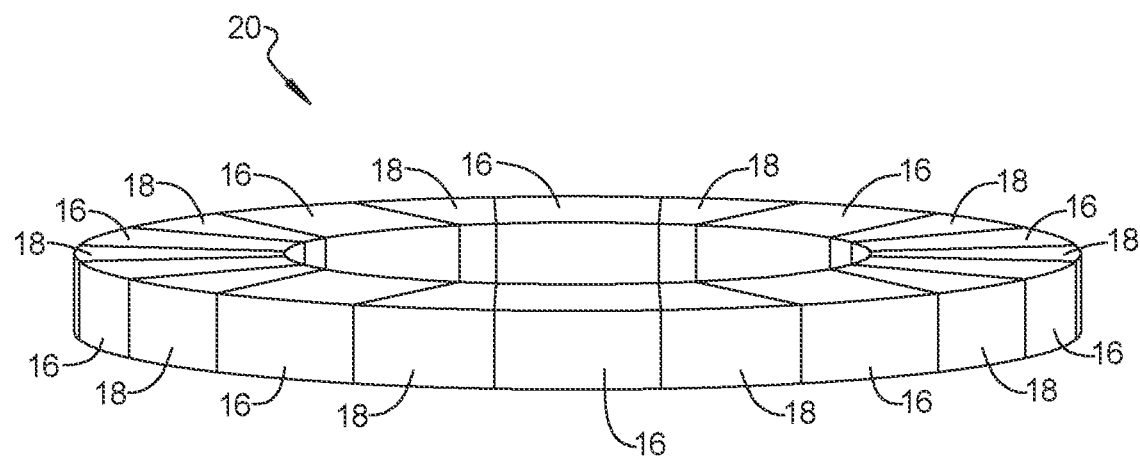
FIG. 3 is a perspective view of a rotor core according to an exemplary embodiment, including generally rectangular lamination blocks.
Figure 4:
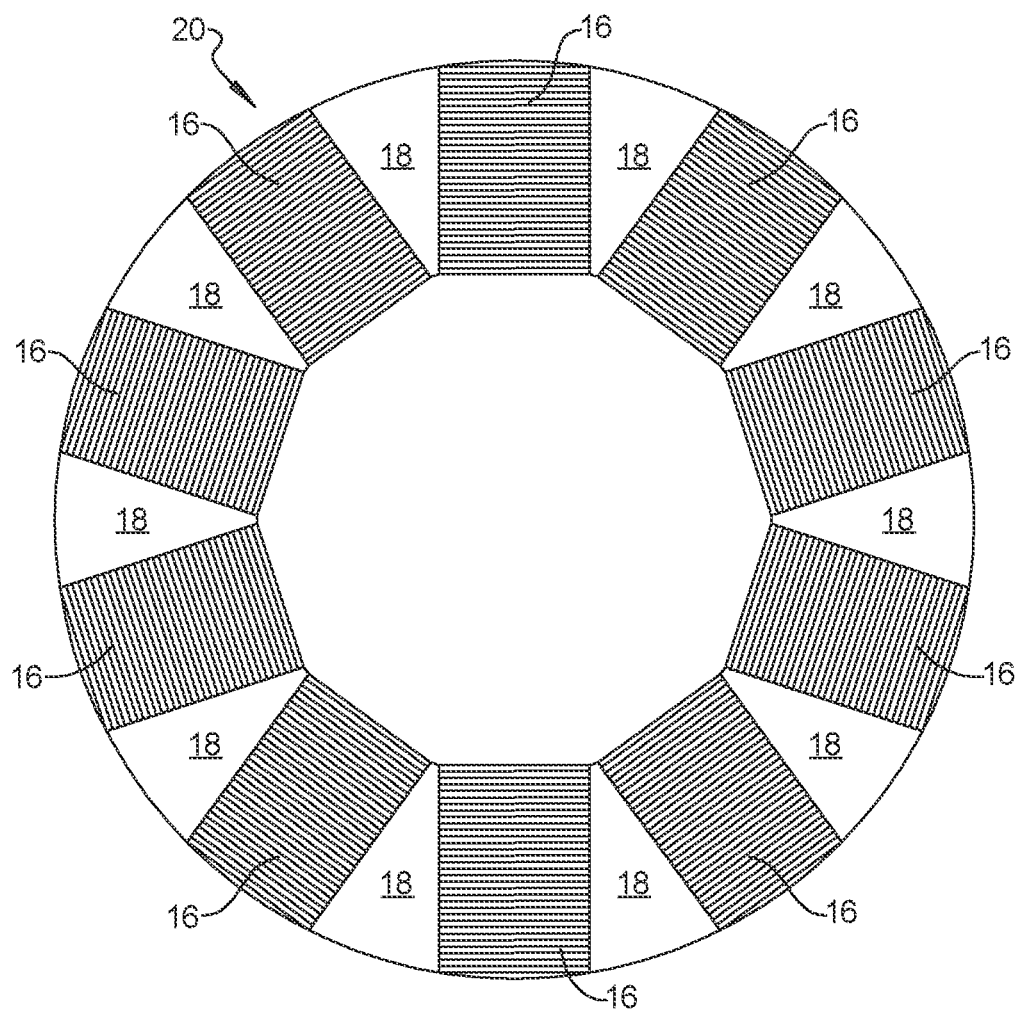
FIG. 4 is a top view of the rotor core shown in FIG. 3.
Figure 5:
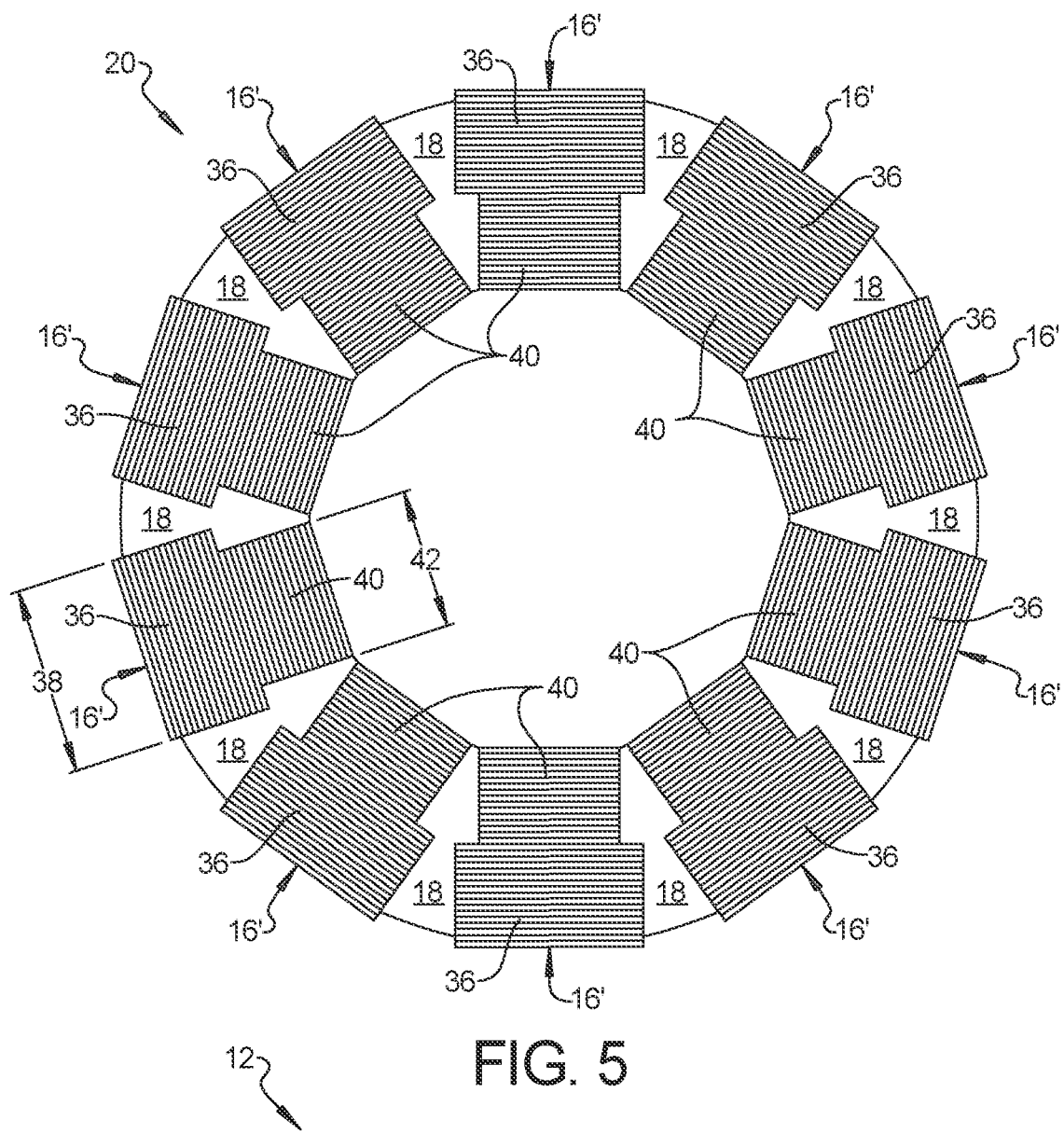
FIG. 5 is a top view of a rotor core according to an exemplary embodiment, including stepped lamination blocks.

Referring to FIG. 3 and FIG. 4, in an exemplary embodiment, the lamination blocks 16 are generally rectangular in shape. The lamination blocks 16 provide for higher density magnetic fields 30. If the rotor core 12 has a higher proportion of lamination block 16 to soft magnetic composite material, the torque that the electric motor 10 can generate is higher. Referring to FIG. 5, in an exemplary embodiment, the lamination blocks 16' are stepped. By using stepped lamination blocks 16', the proportion of lamination block 16' to soft magnetic composite material is increased, thus increasing the torque producing capacity of the electric motor 10. The use of lamination blocks 16, 16' having higher magnetic permeability also allows the rotor core disk 20 to be designed thinner than a rotor core 12 with a lower proportion of lamination block 16 or no lamination blocks 16 at all.

The rotor cores 12 shown in FIG. 3, FIG. 4 and FIG. 5 include ten lamination blocks 16, 16' and ten conductive wedges 18. It should be understood by those skilled in the art that any suitable number of alternating lamination blocks 16, 16' and conductive wedges 18 may be used without departing from the scope of the present disclosure.

As shown in FIG. 5, each lamination block 16' includes a first portion 36 that has a first width 38 and a second section 40 that has a second width 42, wherein the second width 42 is less than the first width 38. It should be understood that each lamination block 16' could include any suitable number is portions having gradually smaller widths closer to the inner diameter 22 of the rotor core 12.

Figure 6:
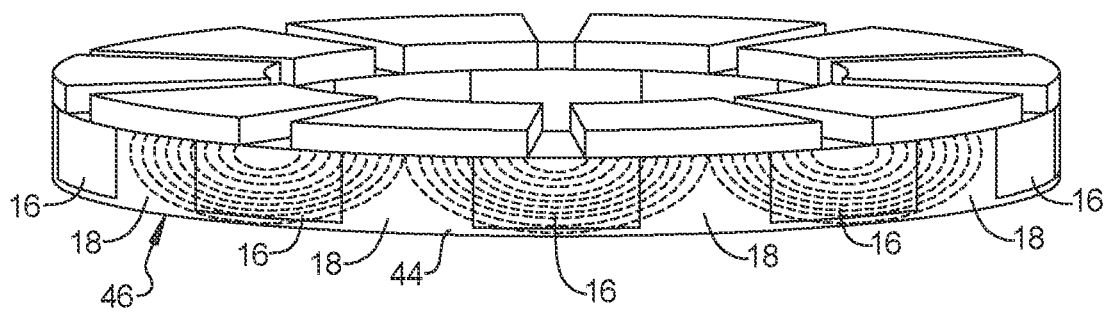
FIG. 6 is a perspective view of a stator core according to an exemplary embodiment, including a back plate.

Referring to FIG. 6, in another exemplary embodiment the rotor core 12 includes a back plate 44 made from soft magnetic composite material. The back plate 44 and the plurality of conductive wedges 18 are integrally formed and define a frame 46. This provides additional structure to support the lamination blocks 16 and secure the lamination blocks 16 and conductive wedges 18 together. Referring again to FIG. 2, without the back plate 44, the lamination blocks 16 and the conductive wedges 18 are glued together. The back plate 44 provides significantly more rigidity when the lamination blocks 16 are glued onto it. Further, a rotor core 12 including a back plate 44 reduces the complexity of assembling the rotor core 12 and improves mechanical tolerances of the rotor core 12.

A rotor core 12 and an axial flux electric motor 10 having a rotor core 12 in accordance with the present disclosure offers several advantages. By using the higher magnetic permeability of the lamination blocks 16 where needed at the positions 32 where high density magnetic fields 30 flow, higher torque capacity of the electric motor 10 with lower core losses can be achieved. By using the lower flux permeability of the soft magnetic composite material of the conductive wedges 18 at positions 34 where lower density magnetic fields 30 flow, the manufacturability of the rotor core 12 can be simplified without sacrificing performance of the electric motor 10.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A rotor core for an axial flux electric motor, comprising:
   a plurality of lamination blocks arranged in an annular pattern;
   a plurality of conductive wedges, one conductive wedge being positioned between each adjacent pair of lamination blocks, the plurality of lamination blocks and the plurality of conductive wedges defining a rotor core disk having an inner diameter and outer diameter and first and second axial faces, the first axial face being opposite the second axial face, the plurality of lamination blocks and the plurality of conductive wedges collectively defining the first axial face of the rotor core disk, and the plurality of lamination blocks and the plurality of conductive wedges collectively defining the second axial face of the rotor core disk; and
   a plurality of permanent magnets attached to the first axial face of the rotor core disk;
   wherein each of the plurality of permanent magnets abuts at least one of the plurality of lamination blocks at the first axial face of the rotor core disk; and
   wherein each of the plurality of permanent magnets abuts at least one of the plurality of conductive wedges at the first axial face of the rotor core disk.

2. The rotor core of claim 1, wherein the lamination blocks are formed of layers of lamination steel, and each of the plurality of permanent magnets is in direct contact with at least two of the plurality of lamination blocks at the first axial face, and each of the plurality of permanent magnets is in direct contact with at least two of the plurality of conductive wedges at the first axial face.

3. The rotor core of claim 2, wherein the lamination blocks are generally rectangular in shape.

4. The rotor core of claim 2, wherein the lamination blocks are stepped, each of the plurality of lamination blocks includes a first section and a second section directly coupled to the first section, the first section is closer to the outer diameter than the second section, the first section has an outermost wall, the outermost wall has a linear shape, the outermost wall is closer to the outer diameter than to the inner diameter of the rotor core disk, the first section extends from the outermost wall to a transition point, the first section has a first width that is consistent from the outermost wall to the transition point, the first section is connected to the second section at the transition point, the second section has an innermost wall, the innermost wall is closer to the inner diameter than to the outer diameter of the rotor core disk, the innermost wall has a linear shape, the second section has a second width that is consistent from the transition point to the innermost wall, and the first width is greater than the second width.

5. The rotor core of claim 2, wherein the lamination steel is a grain oriented lamination steel.

6. The rotor core of claim 2, wherein the lamination steel is a non-grain oriented lamination steel.

7. The rotor core of claim 2, wherein the conductive wedges are formed from a soft magnetic composite material.

8. The rotor core of claim 7, further including a back plate made from soft magnetic composite material and integrally formed with the plurality of conductive wedges, the back plate and the plurality of conductive wedges defining a frame, the plurality of lamination blocks supported by the frame.

9. An axial flux electric motor, comprising:
a stator assembly; and
a rotor assembly, the rotor assembly including:
 a plurality of lamination blocks arranged in an annular pattern;
 a plurality of conductive wedges, one conductive wedge being positioned between each adjacent pair of lamination blocks, the plurality of lamination blocks and the plurality of conductive wedges defining a rotor core disk having an inner diameter and outer diameter and first and second axial faces, the first axial face being opposite the second axial face, the plurality of lamination blocks and the plurality of conductive wedges collectively defining the first axial face of the rotor core disk, and the plurality of lamination blocks and the plurality of conductive wedges collectively defining the second axial face of the rotor core disk; and
 a plurality of permanent magnets attached to one of the first axial face of the rotor core disk;
 wherein each of the plurality of permanent magnets abuts at least one of the plurality of lamination blocks at the first axial face; and
 wherein each of the plurality of permanent magnets abuts at least one of the plurality of conductive wedges at the first axial face.

10. The axial flux electric motor of claim 9, wherein the lamination blocks are formed of layers of lamination steel, and each of the plurality of permanent magnets is in direct contact with at least two of the plurality of lamination blocks at the first axial face, and each of the plurality of permanent magnets is in direct contact with at least two of the plurality of conductive wedges at the first axial face.

11. The axial flux electric motor of claim 10, wherein the lamination blocks are generally rectangular in shape.

12. The axial flux electric motor of claim 10, wherein the lamination blocks are stepped, each of the plurality of lamination blocks includes a first section and a second section directly coupled to the first section, the first section is closer to the outer diameter than the second section, the first section has an outermost wall, the outermost wall has a linear shape, the outermost wall is closer to the outer diameter than to the inner diameter of the rotor core disk, the first section extends from the outermost wall to a transition point, the first section has a first width that is consistent from the outermost wall to the transition point, the first section is connected to the second point at the transition point, the second section has an innermost wall, the innermost wall is closer to the inner diameter than to the outer diameter of the rotor core disk, the innermost wall has a linear shape, the second section has a second width that is consistent from the transition point to the innermost wall, and the first width is greater than the second width.

13. The axial flux electric motor of claim 10, wherein the lamination steel is a grain oriented lamination steel.

14. The axial flux electric motor of claim 10, wherein the lamination steel is a non-grain oriented lamination steel.

15. The axial flux electric motor of claim 10, wherein the conductive wedges are formed from a soft magnetic composite material.

16. The axial flux electric motor of claim 15, further including a back plate made from soft magnetic composite material and integrally formed with the plurality of conductive wedges, the back plate and the plurality of conductive wedges defining a frame, the plurality of lamination blocks supported by the frame.

17. A rotor core for an axial flux electric motor, comprising:
an annular frame including a back plate and a plurality of conductive wedges, the back plate being disk shaped and the plurality of conductive wedges being formed on an axial surface of the back plate and spaced circumferentially around the back plate;
a plurality of lamination blocks, one lamination block being positioned between each adjacent pair of conductive wedges on the annular frame, the frame, the plurality of lamination blocks and the plurality of conductive wedges defining a rotor core disk having an inner diameter and outer diameter and first and second axial faces, the first axial face being opposite the second axial face, the plurality of lamination blocks and the plurality of conductive wedges collectively defining the first axial face of the rotor core disk, and the plurality of lamination blocks and the plurality of conductive wedges collectively defining the second axial face of the rotor core disk; and
a plurality of permanent magnets attached to the first axial face of the rotor core disk;
wherein each of the plurality of permanent magnets abuts at least one of the plurality of lamination blocks at the first axial face; and
wherein each of the plurality of permanent magnets abuts at least one of the plurality of conductive wedges at the first axial face.

18. The rotor core of claim 17 wherein the lamination blocks are formed of layers of lamination steel, the lamination steel being one of a grain oriented lamination steel and a non-grain oriented lamination steel.

19. The rotor core of claim 18, wherein the lamination blocks are one of generally rectangular in shape and stepped, each of the plurality of lamination blocks includes a first section and a second section directly coupled to the first section, the first section is closer to the outer diameter than the second section, the first section has an outermost wall, the outermost wall has a linear shape, the outermost wall is closer to the outer diameter than to the inner diameter of the rotor core disk, the first section extends from the outermost wall to a transition point, the first section has a first width that is consistent from the outermost wall to the transition point, the first section is connected to the second point at the transition point, the second section has an innermost wall, the innermost wall is closer to the inner diameter than to the outer diameter of the rotor core disk, the innermost wall has a linear shape, the second section has a second width that is consistent from the transition point to the innermost wall, and the first width is greater than the second width.

20. The rotor core of claim 19, wherein the back plate and the plurality of conductive wedges of the frame are integrally formed from a soft magnetic composite material.

\* \* \* \* \*